UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 412,269, dated October 8, 1889.

Application filed January 19, 1889. Serial No. 296,922. (Specimens.)

*To all whom it may concern:*

Be it known that I, WILLIAM KIEL, a citizen of the United States, residing at Butler, in the county of Morris, in the State of New Jersey, have invented an improved process of manufacturing vulcanized plastic compounds into which wood enters as an ingredient in large quantities, (for which compounds I have filed simultaneously herewith application for Letters Patent,) of which the following is a specification.

My new process enables me to produce very superior vulcanized compounds, which if vulcanized so as to produce a hard substance can be used to great advantage in the place of hard rubber, whalebone, ivory, and even wood, and which if vulcanized so as to produce a soft substance can be used to take the place of soft rubber and its compounds, and which possess in each case very superior qualities.

My invention consists in the process of manufacturing vulcanized plastic compounds of which wood is a constituent part, by vulcanizing together wood, sulphur, and oil or other commingling vulcanizable substance, and subsequently combining by vulcanization the product thus obtained with crude rubber. The proportions between the wood, sulphur, and oil and the time of vulcanization of those ingredients vary with the finished product which it is desired to obtain. If it is to be a hard vulcanized compound, I have obtained excellent results by subjecting these ingredients to vulcanization at a pressure of from fifty-five to sixty pounds for a period of ten hours; if it is to be a soft compound, by subjecting these ingredients to vulcanization at a pressure of sixty pounds for a period of five hours. The wood before being used is reduced to some small form and from its particles all moisture is removed by artificial or other heat, and, if necessary, I wash out any acids that may be in them.

For the purpose of applying my invention, I work in with the requisite quantity of crude rubber, which has been washed and dried upon the heated rollers ordinarily used in the manufacture of rubber, the ingredients above referred to, vulcanized as I have above described, and, if necessary, an additional quantity of sulphur. I thus obtain a compound which is ready for vulcanization.

The time of vulcanization and the pressure vary according to the nature of the flexibility and hardness of the material to be produced. The time and pressure applied in the well-known process of vulcanizing hard rubber will if applied here produce a hard substance. In like manner, the manner, the time, and pressure applied in the well-known process of manufacturing soft rubber will if applied here produce a soft substance; but I do not confine myself to the limits within which these respective processes vary.

The addition of a small quantity of beeswax to my new compound before vulcanization is advantageous, as the wax toughens the finished product.

I do not claim the vulcanized plastic compounds which are the product of the herein-described process, as I have filed simultaneously herewith application for Letters Patent for those compounds; but What I do claim, and desire to secure by Letters Patent, is—

1. The herein-described process of manufacturing vulcanized plastic compounds of which wood is a constituent part by vulcanizing together wood, sulphur, and a commingling vulcanizable substance, and subsequently combining by vulcanization the product thus obtained with crude rubber, substantially as described.

2. The herein-described process of manufacturing vulcanized plastic compounds of which wood is a constituent part by vulcanizing together wood, sulphur, and oil, and subsequently combining by vulcanization the product thus obtained with crude rubber, substantially as described.

WILLIAM KIEL.

Witnesses:
JAMES R. SHEFFIELD,
THOMAS HUNT.